Figure 1:
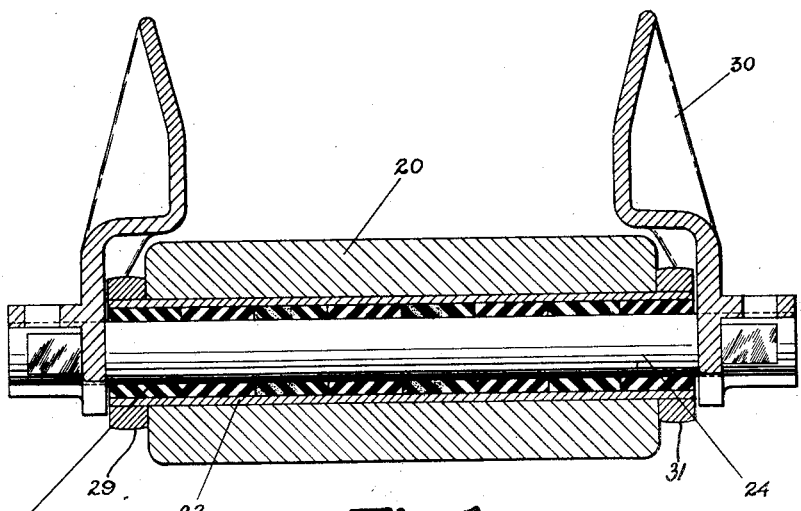

Dec. 11, 1945.   H. E. WENING ET AL   2,390,905

OSCILLATING JOINT

Filed Oct. 12, 1942

RESILIENT MATERIAL
CONTAINING CARBON
BLACK

INVENTORS
HERMAN E. WENING
REX E. MOULE

Patented Dec. 11, 1945

2,390,905

UNITED STATES PATENT OFFICE 2,390,905

OSCILLATING JOINT

Herman E. Wening and Rex E. Moule, Dayton, Ohio, assignors to General Motors Corporation, Detroit, Mich., a corporation of Delaware Application October 12, 1942, Serial No. 461,658

5 Claims. (Cl. 173—324)

This invention relates to oscillating joints, used in chains and tracks for track laying vehicles, such as tanks, tractors and the like. Joints of this character are often made by interposing rubberlike material between two concentric and spaced joint members whereby the rubber through its distortion permits relative oscillatory movement of the joint members. Such joints are generally formed by disposing a plurality of spaced rubber rings on an inner member and then assembling the inner member with the rings thereon within an outer joint member of tubular shape wherein the rubberlike rings are placed under high radial compression and are distorted axially so that when the two members are assembled the rubberlike material substantially fills the space therebetween.

In the use of the oscilating joints of the character described in tanks wherein radio equipment is used it is desirable to provide conducting members between the portions of the oscillating joint for conducting charges of static electricity from one part to another and thereby prevent an accumulation thereof. In the past such contact members were formed from phosphor bronze clips and the like, such as is described in Hanson Patent 2,291,623, which shows an oscillating joint of the general character described including the clip conductors.

While such a conductor is satisfactory from an electrical conductivity standpoint it has been found that these conductors in certain instances break and thereby destroy the electrical conducting path between the members of the joint. In order to provide an electrical conductor in an oscillating joint of the type described which is certain to function under any and all conditions we prefer to utilize rings of the rubberlike material which themselves are conducting in nature and thereby provide an electrical conducting path under all conditions.

Therefore, an object of this invention is to provide an electrical conductor for use in oscillating joints for preventing accumulation of the electrical charges on one of the joint members which conductor is in itself resilient in nature.

A further object is to provide an oscillating joint which includes a conducting path between portions thereof that is non-metallic in nature, and wherein the conductor forms a portion of the oscillating joint.

Further objects and advantages of the present invention will be apparent from the following description, reference being had to the accompanying drawing wherein a preferred embodiment of the present invention is clearly shown.

Figure 2:
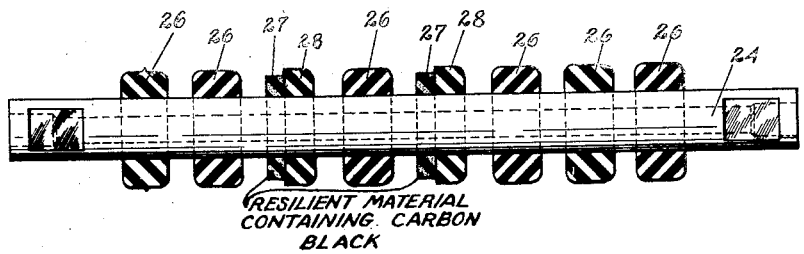

In the drawing:

Fig. 1 is a longitudinal view taken in section through a joint construction in accordance with the present invention; and Fig. 2 is a view of the inner joint member showing the concentric rubber ring and the conductor rings in section thereon prior to the assembly of the joint.

Referring particularly to Fig. 1, a sectional view of the joint in connection with the tank track is shown, which comprises a track block 20 usually made from rubber or other suitable material and mounted upon a tubular sleeve 22 which is one member of the oscillating joint. The inner member of this joint is designated at 24 and comprises a rod extending transversely through the sleeve and spaced therefrom by means of a plurality of rubberlike rings 26, 27 and 28 to be described hereinafter. The projecting ends of rod 24 connect with links of adjacent track blocks 30 such connections being well known in the art. The track blocks 20 are spaced from the links 30 by means of spacers 29 and 31 carried on the sleeve 22.

Rod 24 prior to assembly in the joint is provided with a plurality of spaced rubberlike rings 26, 27 and 28 as shown in Fig. 2. The rings 26 are formed from rubber or other suitable rubberlike material which is resilient in character. The rings 28 are formed from similar material and are approximately one half of the width of the rings 26. The rings 27 are likewise formed from rubberlike material but include an appreciable amount of acetylene carbon black one type being known as "Shawinigan black." Although we prefer to use acetylene carbon black, any carbon black which has similar properties may be used.

The rings 27 are likewise approximately half of the width of the rings 26 and are positioned on the shaft 24 adjacent the two rings 28. It will be noted by referring to Fig. 2, that the rings 27 are of less diameter than rings 26 and 28, and in this connection, the diameter of the rings 27 should be greater than the inside diameter of the tubular sleeve 22. This diameter should be carefully calculated so that the rings, when in position in the joint, are compressed above 8% of their normal free diameter. This point is of particular importance since it has been found that while rubber or rubberlike material, including an appreciable percentage of acetylene carbon black is conducting in nature under usual conditions, that such rubberlike material is not a good conductor of static electricity in this application unless considerable compression in the order of the compression noted is applied. In all cases a trial joint is preferably assembled and electrical measurements noted to obtain best results from the conducting rings.

A joint of the character described provides an electrical path for static electricity from one point of the joint to another. When the shaft or rod 24 with rubber rings 26, 27 and 28 thereon is assembled within the sleeve 22, the rubberlike material in the rings is compressed so as to form a substantially continuous rubber sleeve between the two portions of the joint.

We have found that a conducting rubber ring may be made by utilizing numerous formulas although preferably we utilize the following formula in the fabrication of such rings:

|  | Per cent |
|---|---|
| Rubber | 51.0 |
| Accelerator | .5 |
| Zinc oxide | 2.5 |
| Antioxidant | .5 |
| Sulphur | 1.5 |
| Stearic acid | 1.0 |
| Pine tar | 2.0 |
| Acetylene carbon black | 41.0 |

In this formula it is understood that in place of rubber some other rubberlike material may be utilized such as reclaimed rubber, mixtures of reclaimed and crude rubber, synthetic rubbers, etc. In some of these cases, the use of accelerators, fillers etc., may be dispensed with or modified. In all cases however the rubber or rubberlike material should make up 40% or more of the total composition and the acetylene carbon black should be in quantities of above 38%. It is apparent that when the quantity of acetylene carbon black greatly exceeds this figure, that the part lacks strength and cohesion, while, when the carbon black is under the range noted, the conductivity of the part is decreased below a desirable figure. While these figures are for acetylene blacks it should be understood that if other conducting carbon blacks are used that the quantity should be arrived at by trial to assure proper conductivity and cohesiveness.

We have found as heretofore noted, that the compression of the rubber rings 27 is a major factor in the success of this invention, as evidenced by the fact that the conductivity of these rings is increased approximately 1,000 times by 25% distortion of the part as noted by electrical measurements. Thus, this factor is of great importance in making up joints of this character and should be checked by measurement on each new application to insure proper conductivity of the parts.

While the embodiment of the present invention as herein disclosed, constitutes a preferred form, it is to be understood that other forms might be adopted, all coming within the scope of the claims which follow.

What is claimed is as follows:

1. An oscillating joint comprising an outer tubular metallic sleeve member, an inner metallic member disposed to fit within the outer said member and having a clearance therebetween, a rubberlike bushing containing 38% or more of a conductive carbon black therein disposed around said inner member and between said inner member and said sleeve and held therebetween under compression sufficient to at least reduce the normal free diameter of the bushing 8% or more whereby a conducting path for electrical charges from said sleeve to said member is formed through the bushing.

2. An oscillating joint comprising inner and outer metallic members in telescopic relation to one another and adapted to oscillate with respect to one another, said members being held spaced apart by a rubberlike bushing disposed therebetween and concentric therewith, said rubberlike bushing including therein at least 38% by weight of a conductive carbon black, said bushing being held in a compressed condition between the two members so as to distort the bushing at least 8% from its normal free diameter.

3. An oscillating joint comprising inner and outer metallic members in telescopic relation to one another and adapted to oscillate with respect to one another, said member being held spaced apart by a rubberlike bushing disposed therebetween and concentric therewith, said rubberlike bushing including therein at least 38% by weight of a conductive carbon black, said bushing being held in a compressed condition between the two members so as to distort the rubber bushing between 8% to 50% of its normal free diameter.

4. An oscillating joint comprising in combination an inner metallic and an outer metallic member adapted to be disposed in telescopic relation with respect to one another, a plurality of rubber rings disposed on said inner member and compressed between said inner member and said outer member for holding said members in spaced relation with respect to one another, said rings being compressed sufficiently between the two members to distort their normal free diameter at least 8%, at least one of said rings being conducting in nature by means of the inclusion therein of a conductive carbon black in percentages above 38% of the total weight of the materials in the ring, said ring forming an electrical conducting path between the inner and outer members.

5. An oscillating joint comprising in combination an inner metallic member and an outer metallic member adapted to be disposed telescopically with respect to one another, a plurality of rubber rings disposed on said inner member and compressed between said inner member and said outer member said members in spaced relation with respect to one another, said rings being compressed sufficiently between the two members to distort the normal free diameter above 8% and below 50%, at least one of the rings being conducting in nature by means of the inclusion therein of a conductive "Shawinigan" black in percentages between 38% and 41% of the total weight of the materials in the ring, said ring forming an electrical and conducting path between the inner and outer members.

HERMAN E. WENING.
REX E. MOULE.